(12) United States Patent
Sugano et al.

(10) Patent No.: US 11,171,505 B2
(45) Date of Patent: Nov. 9, 2021

(54) ELECTRIC POWER CONTROL DEVICE

(71) Applicants: KEIHIN CORPORATION, Tokyo (JP); HONDA MOTOR CO., LTD., Tokyo (JP)

(72) Inventors: Kazuya Sugano, Sakura (JP); Kazutaka Senoo, Utsunomiya (JP); Koji Suzuki, Natori (JP); Yasuhiko Kondo, Wako (JP); Yasushi Hori, Wako (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/011,412

(22) Filed: Sep. 3, 2020

(65) Prior Publication Data
US 2021/0075250 A1    Mar. 11, 2021

(30) Foreign Application Priority Data

Sep. 6, 2019  (JP) .............................. JP2019-163297

(51) Int. Cl.
*H02J 9/06* (2006.01)
*B60R 16/033* (2006.01)
*H02J 7/00* (2006.01)
*B60L 50/50* (2019.01)

(52) U.S. Cl.
CPC .............. *H02J 9/06* (2013.01); *B60R 16/033* (2013.01); *H02J 7/0063* (2013.01); *B60L 50/50* (2019.02)

(58) Field of Classification Search
CPC . H02J 9/06; H02J 7/0063; H02J 7/345; B60R 16/033; B60L 3/00; B60L 50/50; H02P 27/06
USPC ............................................ 307/10.1, 64, 65
See application file for complete search history.

(56) References Cited

U.S. PATENT DOCUMENTS

| 2019/0061654 A1* | 2/2019 | Tsuji ...................... B60L 58/10 |
| 2019/0168613 A1* | 6/2019 | Takegawa ............. H02P 29/024 |
| 2019/0190294 A1* | 6/2019 | Sato ........................ H02J 1/108 |

FOREIGN PATENT DOCUMENTS

JP            H09233830 A      9/1997

* cited by examiner

*Primary Examiner* — Michael R. Fin
(74) *Attorney, Agent, or Firm* — Cantor Colburn LLP

(57) ABSTRACT

An electric power control device includes: an ECU; a DC power supply; a backup power supply which has a control power supply as an operation source, supplies electric power to the ECU when an electric power supply from a battery to the ECU is stopped, and supplies electric power to the DC power supply when an electric power supply from the battery to the DC power supply is stopped; a first ground line connected to a ground terminal of the DC power supply; a second ground line connected to a ground terminal of the backup power supply; a current path formation unit which electrically connects the first ground line to the second ground line and forms a path in which a current flows from the first ground line to the second ground line in one direction; and a noise minimizing component connected to the current path formation unit in series.

3 Claims, 3 Drawing Sheets

ELECTRIC POWER CONTROL DEVICE

CROSS-REFERENCE TO RELATED APPLICATION

The present invention claims priority under 35 U.S.C. § 119 to Japanese Patent Application No. 2019-163297, filed Sep. 6, 2019, the entire content of which is incorporated herein by reference.

BACKGROUND OF THE INVENTION

Field of the Invention

The present invention relates to an electric power control device.

Description of Related Art

Japanese Unexamined Patent Application, First Publication No. H9-233830 describes an electric power control unit (an electric power control device) installed in a vehicle. The power control device includes an electronic control unit (ECU) which controls the electric power from a driving battery for a traveling motor using the electric power from an auxiliary battery provided outside thereof as an operation source. Since the ECU is electrically connected to the auxiliary battery via a first electric power line and a second ground line for the ECU, electric power is acquired from the auxiliary battery.

Incidentally if electric power is no longer supplied the auxiliary battery to the ECU due to some abnormal state, an operation of the ECU stops. Therefore, in order to prevent such a situation, when the electric power supply from the auxiliary battery to the ECU is stopped, a backup power supply configured to supply electric power to the ECU is required.

SUMMARY OF THE INVENTION

Here, the electric power control device may include a direct current (DC) power supply which generates a control power supply from the electric power obtained from the auxiliary battery in many cases. Furthermore, the backup power supply may operate through the control power supply generated using the DC power supply and supply electric power to the ECU in some cases. In addition, the backup power supply supplies electric power to the ECU using a potential of the second ground line as a reference.

Thus, in such a case, when the first electric power line and the second ground line are broken due to an abnormal state, the electric power supply from the auxiliary battery to the ECU is stopped, and a second electric power line configured to supply electric power from the auxiliary battery to the control power supply is also broken, the above reference and the control power supply may be lost and an operation of the backup power supply may stop in some cases. As a result, the electric power supply to the ECU is stopped.

An aspect according to the present invention was made in view of such circumstances, and an object of the present invention is to provide an electric power control device capable of supplying electric power from a backup power supply to an ECU even when a first electric power line, a second electric power line, and a second ground line are broken.

(1) An aspect of the present invention is an electric power control device installed in a vehicle which includes: an electronic control unit (ECU) to which electric power is supplied from a battery installed in the vehicle; a direct current (DC) power supply configured to generate a control power supply from the electric power supplied from the battery; a backup power supply configured to operate using the control power supply as an operation source, supply electric power to the ECU when the electric power supply from the battery to the ECU is stopped, and supply electric power to the DC power supply when the electric power supply from the battery to the DC power supply is stopped; a first ground line connected to a ground terminal of the DC power supply; a second ground line connected to a ground terminal of the backup power supply; a current path formation unit which electrically connects the first ground line to the second ground line and forms a path in which a current flows from the first ground line to the second ground line in one direction; and a noise minimizing component connected to the current path formation unit in series.

(2) In the aspect (1), the current path formation unit may have be a diode which has an anode electrically connected to the first ground line and a cathode electrically connected to the second ground line.

(3) In the aspect (2), the noise minimizing component may be an inductor, and the inductor may have a first end portion connected to the cathode and a second end portion connected to the second ground line.

According to an aspect associated with the present invention, it is possible to supply electric power from a backup power supply to an ECU even when a first electric power line, a second electric power line, and a second ground line are broken.

DETAILED DESCRIPTION OF THE INVENTION

An electric power control device according to this embodiment will be described below with reference to the drawings.

Figure 1:
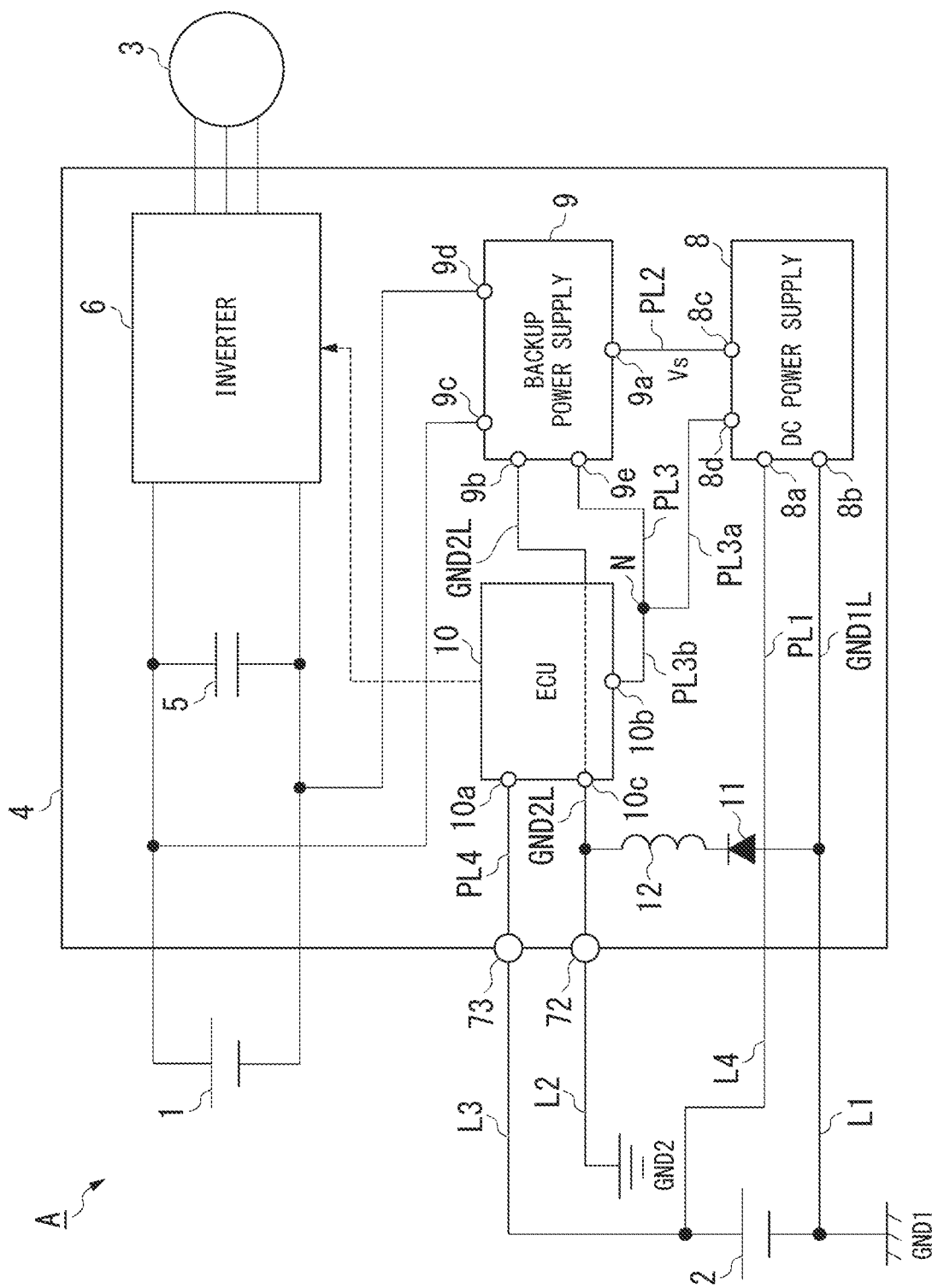
FIG. 1 is a diagram illustrating a constitution of a vehicle including an electric power control device according to an embodiment.

FIG. 1 is a diagram illustrating a constitution of a vehicle A including the electric power control device according to this embodiment. The vehicle A illustrated in FIG. 1 is, for example, a hybrid vehicle or an electric vehicle.

As illustrated in FIG. 1, the vehicle A includes a first battery 1, a second battery 2, a motor 3, and an electric power control device 4.

The first battery is, for example, a rechargeable secondary battery such as a lithium ion battery. The first battery 1 is a so-called high voltage battery and is used to drive the motor 3.

The second battery 2 is, for example, a rechargeable secondary battery such as a lithium ion battery. The second battery 2 is a so-called low-voltage battery and supplies electric power to a low-voltage-type device such as an auxiliary device.

The motor 3 may be an electric motor for traveling of the vehicle A, an electric motor used as an electric generator driven using an engine of the vehicle A and configured to start-up the engine, or both of them.

The electric power control device 4 is connected to each of the first battery 1 and the motor 3, converts direct current (DC) electric power W1 from the first battery 1 into an alternating current (AC) electric power, and supplies the AC electric power to the motor 3. The electric power control device 4 may convert regenerative electric power which is an AC electric power generated using the motor 3 into DC electric power and supply the DC electric power to the first battery 1. That is to say, the electric power control device 4 controls the supply of electric power between the first battery and the motor 3.

The electric power control device 4 is connected to the second battery 2 and uses a DC electric power W2 of the second battery 2 as a power source of the low-voltage-type device.

An example of a schematic constitution of the electric power control device 4 according to this embodiment will be described below.

The electric power control device 4 according to this embodiment includes a capacitor 5, an inverter 6, a connector 7, a DC power supply 8, a backup power supply 9, an electronic control unit (ECU) 10, a current path formation unit 11, and a noise minimizing component 12.

The capacitor 5 is a smoothing capacitor provided between the first battery 1 and the inverter 6. The capacitor 5 has a first end portion connected to a positive terminal of the first battery 1 and a second end portion connected to a negative terminal of the first battery 1.

The inverter 6 rotatably drives the motor 3. The inverter 6 may be controlled by the ECU 10.

The connector 7 is a connection means for connecting the electric power control device 4 to the second battery 2.

For example, the connector 7 includes a first terminal 72 and a second terminal 73.

The first terminal 72 is connected to a second ground (GND2). The second ground (GND2) is a reference potential for operating the backup power supply 9 and the ECU 10. To be specific, the first terminal 72 is connected to a connection line L2 (a GND2 line) for the second ground and is grounded to the second ground (GND2). For example, the connection line L2 has a first end portion connected to the first terminal 72 and a second end portion connected to the second ground (GND2).

The second ground (GND2) and a first ground (GND1) are connected to a vehicle body of the vehicle A at one point and the second ground (GND2) has a higher potential than the first ground (GND1).

The second terminal 73 is connected to a positive terminal of the second battery 2 via the connection line L3 (a first electric power line). For example, the connection line L3 has a first end portion connected to the second terminal 73 and a second end portion connected to the positive terminal of the second battery 2.

The DC power supply 8 generates a control power supply Vs from an electric power W2 supplied from the second battery 2. To be specific, the DC power supply 8 includes a power source terminal 8a, a ground terminal 8b, and an output terminal 8c. The power source terminal 8a is connected to the positive terminal of the second battery 2 via a first power source line PL1. Here, the first power source line PL1 is connected to the positive terminal of the second battery 2 via the connection line L4 (a second electric power line). The connection line L4 has a first end portion connected to the first power source line PL1 and a second end portion connected to the positive terminal of the second battery 2.

The ground terminal 8b is connected to a first ground line GND1L. The output terminal 8c is connected to the backup power supply 9. The DC power supply 8 generates the control power supply Vs from the electric power W2 using a potential of the ground terminal 8b, that is, a potential of the first ground line GND1L, as a reference and outputs the control power supply Vs to the output terminal 8c.

The connection line L1 is connected to the first ground line GND1L. The connection line L1 has a first end portion connected to the first ground line GND1L and a second end portion connected to a negative terminal of the second battery 2. Furthermore, the negative terminal of the second battery 2 is connected to the first ground (GND1).

The backup power supply 9 operates using the control power supply Vs as an operation source and generates an electric power W3 from an electric power W1 from the first battery 1. For example, the backup power supply 9 may step down the electric power W1 from the first battery 1 and generate the electric power W3.

The backup power supply 9 supplies the electric power W3 to the ECU 10 when the electric power supply from the second battery 2 to the ECU 10 is stopped and supplies the electric power W3 to the DC power supply 8 when the electric power supply from the second battery 2 to the DC power supply 8 is stopped.

To be specific, the backup power supply 9 includes the power source terminal 9a, the ground terminal 9b, a first input terminal 9c, a second input terminal 9d, and the output terminal 9e. The power source terminal 9a is connected to the output, terminal 8c via a second power source line PL2. The ground terminal 9b is connected to a second ground line GND2L. The second ground line GND2L is connected to the first terminal 72. Thus, the ground terminal 9b is connected to the first terminal 72 via the second ground line GND2L. The first input terminal 9c is connected to the first end portion of the capacitor 5. The second input terminal 9d is connected to the second end portion of the capacitor 5. The output terminal 9e is connected to the ECU 10 via a third power source line PL3. The output terminal 9e is connected to the power source terminal 8a of the DC power supply 8 via the third power source line PL3.

The third powersource line PL3 branches into a branch powersource line PL3a and a branch power source line PL3b at a branch point N midway therealong.

The branch power source line PL3a has a first end portion connected to the branch point N and a second end portion connected to the power source terminal 8d of the DC power supply 8.

A second branch power source line PL3b has a first end portion connected to the branch point N and a second end portion connected to the ECU 10.

The backup power supply 9 generates the electric power W3 from the electric power W1 input to the first, input terminal 9c and the second input terminal 9d using a potential of the ground terminal 9b, that is, a potential of the second ground line GND2L, and outputs the electric power W3 from the output terminal 9e.

The ECU 10 operates by receiving supply of the electric power W2 from the second battery 2 installed in the vehicle A. Here, the ECU 10 receives the supply of electric power W3 from the backup power supply 9 when the electric power supply from the second battery 2 is stopped and continuously operates. The ECU 10 according to this embodiment is a so-called motor ECU which controls the erosion of the inverter 6 and controls the drive of the motor 3.

Here, the ECU 10 according to this embodiment s not limited to a motor ECU and may be any ECU installed in the vehicle A.

The ECU 10 includes a first power source terminal 10*a*, a second power source terminal 10*b*, and the ground terminal 10*c*.

The first power source terminal 10*a* is connected to the second terminal 73 via, a fourth power source line PL4. The second power source terminal 10*b* is connected to the second branch power source line PL3*b*. The ground terminal 10*c* is connected to the first terminal 72 via the second ground line GND2L. The ECU 10 operates using a potential of the ground terminal 10*c*, that is, a potential of the second ground line GND2L, as a reference.

The ECU 10 operates on the basis of electric power W2 input to the first power source terminal 10*a* via the fourth power source line PL4. The ECU 10 operates on the basis of electric power W3 input to the second power source terminal 10*b* via the third power source line PL3*b* when the electric power W2 disappears.

Figure 3:
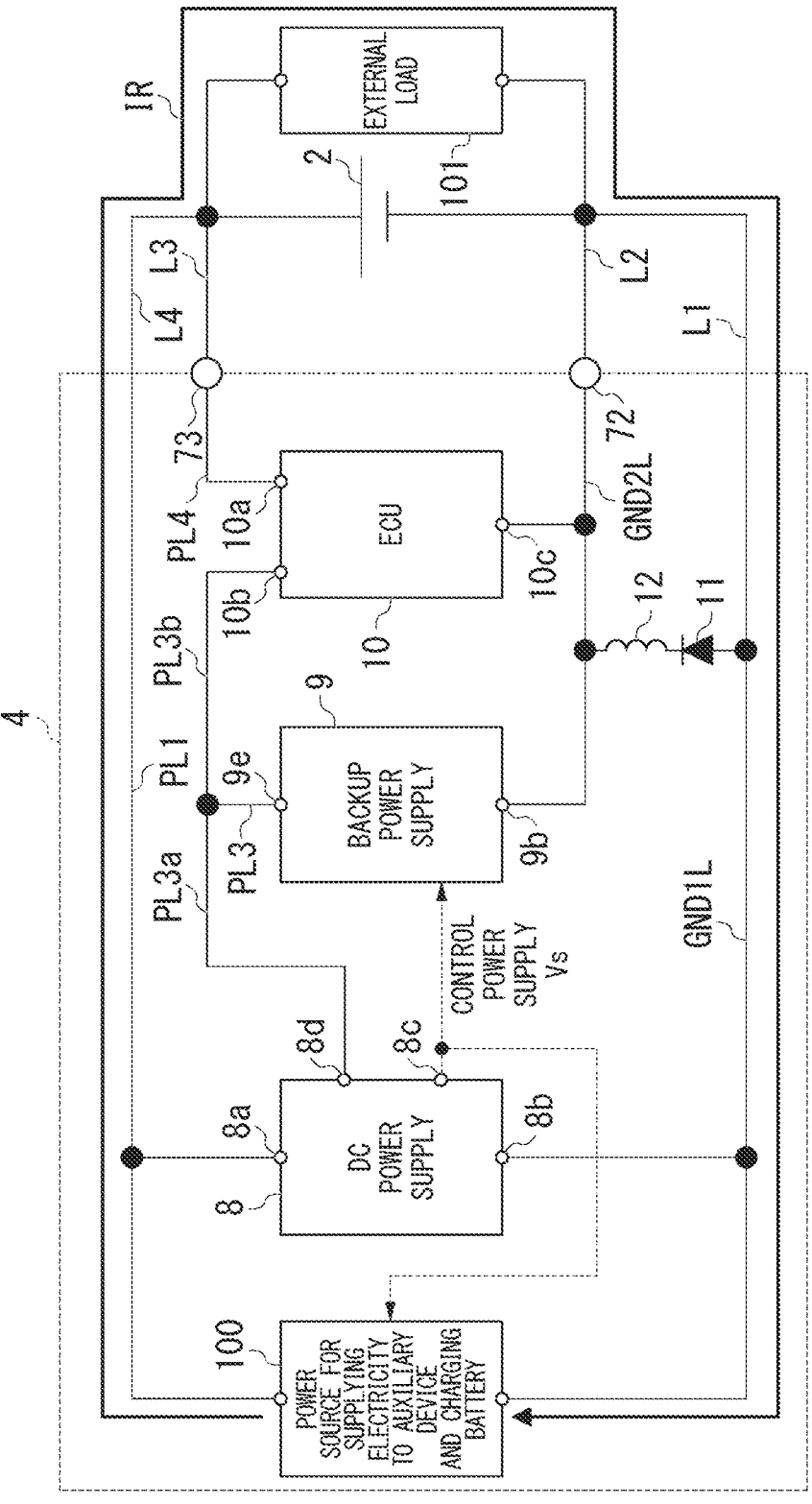
FIG. 3 is a diagram for explaining a current path formation unit according to this embodiment.

The current path formation unit 11 forms a path in which the first ground line GND 1L is electrically connected to the second ground line GND2L and a current flows in one direction from the first ground line GND1L to the second ground line GND2L to prevent an unintended current from flowing from the second ground line GND2L having a high potential to the first ground line GND1L. When an external load 101 is connected to the second battery 2 in parallel, the current path formation unit 11 limits a current from the first ground line to the second ground line GND2L in one direction so that a current loop TB from a power source 100 for supplying electricity to the auxiliary device and charging the battery illustrated in FIG. 3 to the external load 101 is not changed.

For example, the current path formation unit 11 is a diode. Although a case in which the current path formation unit 11 is the diode will be described in this embodiment, the current path formation unit 11 is not limited to a diode and may be any unit configured to form a path in which a current flows from the first ground line GND1L to the second ground line GND2L in one direction. For example, the current path formation unit 11 may be a switch which detects a potential of the second ground line GND2L lower than a potential of the first ground line GND1L and performs a connection.

The current path formation unit 11 has an anode connected to the first ground line GND1L and a cathode connected to the second ground line GND21L via the noise minimizing component 12.

The noise minimizing component 12 is connected to the current path formation unit 11 in series. Here, when the first ground line GND1L is electrically connected to the second ground line GND2L through a diode, instead of circuits in a normal state (I1 and I2 which will be described later), circuits in an abnormal state (I3 and I4 which will be described later) are formed. In the case of these circuits, since the circuits are circuits have a state different from the normal state, there is a concern concerning the occurrence of noise which is not generated in the circuits in a normal state. Thus, when the noise minimizing component 12 is connected to the current path formation unit 11 in series, it is possible to reduce noise generated due to the electrical connection of the current path formation unit 11.

In this embodiment, the noise minimizing component 12 is an inductor. To be specific, the noise minimizing component 12 (the inductor) has a first end portion connected to the cathode of the current path formation unit 11 and a second end portion connected to the second ground line GND2L. Here, the noise minimizing component 12 is not limited to an inductor as long as that adopted can minimize the conduction noise (including the noise generated from the current path formation unit 11) propagating through a third circuit 13 formed using the current path formation unit 11.

Figure 2A:
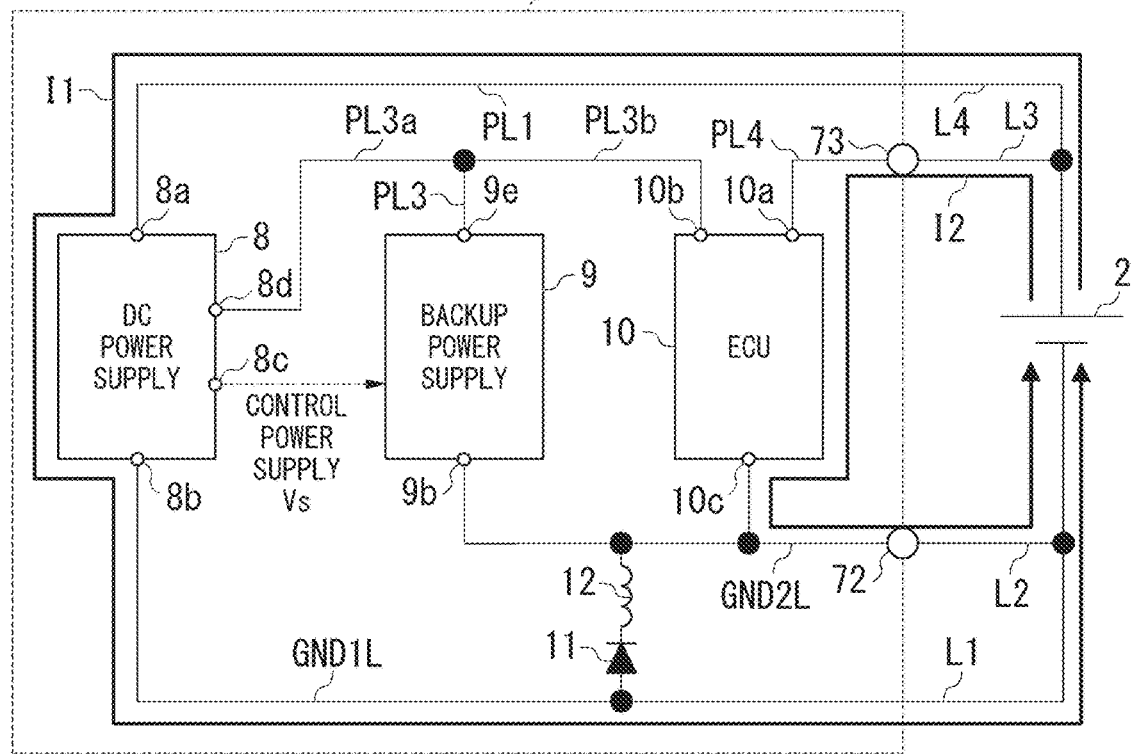
FIG. 2A is a diagram for explaining an operation of the electric power control device according to this embodiment.

An operation of the electric power control device 4 according to this embodiment will be described below. First, an operation (a normal operation) of the electric power control device 4 in a normal state will be described with reference to FIG. 2A. FIG. 2A is a diagram illustrating the normal operation of the electric power control device 4 according to this embodiment.

In a normal state in which the connection lines L1 to L4 are broken, a first circuit I1 in which a current output from the positive terminal of the second battery 2 passes through the connection line L4, the first power source line PIA, the DC power supply 8, the first ground line GND1L, and the connection line L1 and returns to the negative terminal of the second battery 2 is formed. Thus, electric power W2 is supplied from the second battery 2 to the DC power supply 8 through a current flowing through the first circuit 11 and the DC power supply 8 operates using the electric power W2 and generates a control power supply Vs. Furthermore, the DC power supply 8 outputs the generated control power supply Vs from the output terminal 8*c*. For this reason, the backup power supply 9 operates through the control power supply Vs.

In the normal state second circuit 12 in which a current output from the positive terminal of the second battery 2 passes through the connection line L3, the fourth power source line PL4, the ECU 10, the second ground line GND2L, and the connection line 12 and returns to the negative terminal of the second battery 2 is formed. Thus, electric power W2 is supplied from the second battery 2 to the ECU 10 through a current flowing through the second circuit 12 and the ECU 10 operates through the electric power W2.

Figure 2B:
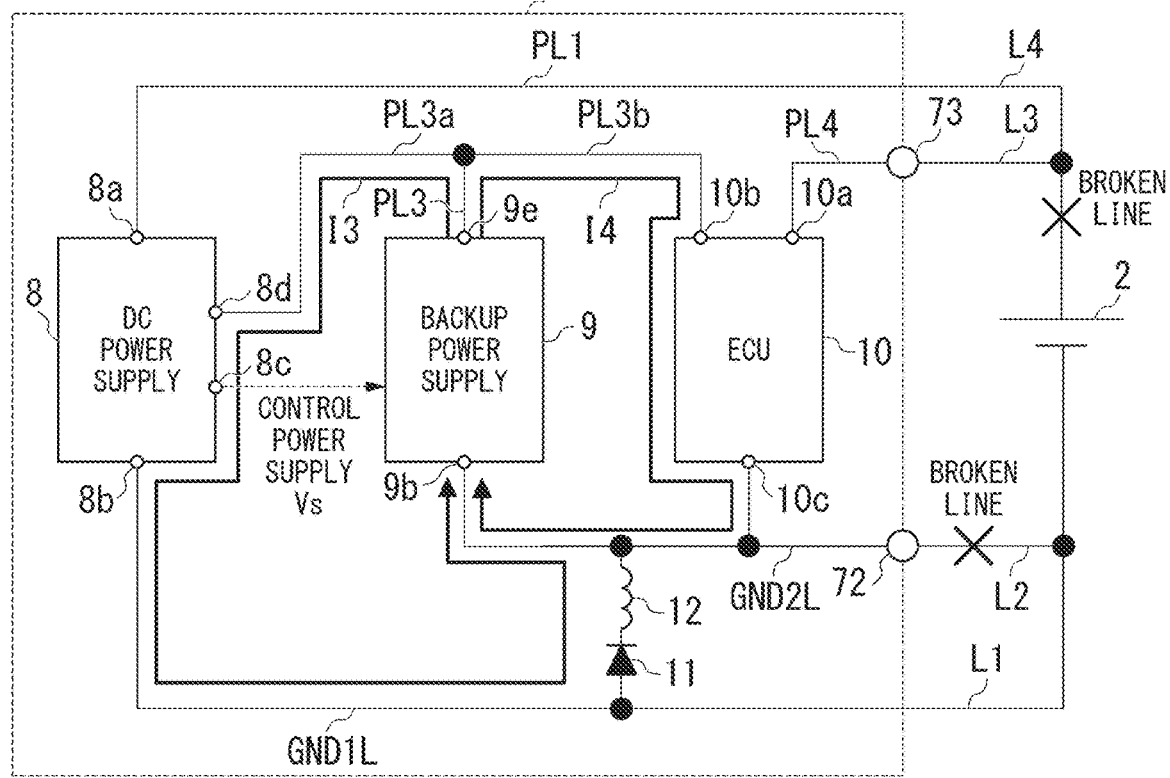
FIG. 2B is a diagram for explaining an operation of the electric power control device according to this embodiment.

An operation of the electric power control device 4 according to this embodiment in an abnormal state will be described below with reference to FIG. 2B. FIG. 2B is a diagram illustrating the operation of the electric power control device 4 according to this embodiment in the abnormal state. Here, the abnormal state means a state in which an electrical connection between the first terminal 72 and the second ground and an electrical connection between the second terminal 73 and the positive terminal of the second battery 2 are all released in accordance with when the connection lines L2 to L4 are broken, when the connector 7 is disconnected, or the like. In this abnormal state, the first circuit I1 and the second circuit I2 illustrated in FIG. 2A are not formed.

In this abnormal state, a third circuit I3 in which a cu rent output from the output terminal 9*e* of the backup power supply 9 passes through the third power source line PL3, the branch power source line PL3*a*, the DC power supply 8, the first ground line GND1L, the current path formation unit 11, the noise minimizing component 12, and the second ground line GND2L and returns to the ground terminal 9*b* of the backup power supply 9 is formed. In this abnormal state, a fourth circuit I4 in which a current output from the output terminal 9*e* of the backup power supply 9 passes through the third power source line PL3, the branch power source line PL3*b*, the ECU 10, and the second ground line GND2L and returns to the ground terminal 9*b* of the backup power supply 9 is formed.

Thus, the DC power supply 8 obtains electric power W3 from the backup power supply 9 through the formed third circuit I3 and continuously operates through the electric power W3. That is to say, since a path in which a current flows from the first ground line GND1L to the second ground line GND2L in one direction is formed through the current path formation unit 11, the third circuit I3 is formed. For this reason, even in the abnormal state, the DC power supply 8 can continuously operate through electric power W3 from the backup power supply 9. Furthermore, since the backup power supply 9 receives the supply of a DC power supply Vs from the DC power supply 8 even in the abnormal state through a continuous operation of the DC power supply 8, the electric power W3 can be supplied to the ECU 10 through the fourth circuit I4. Furthermore, the third circuit I3 includes the noise minimizing component 12. Therefore, the electric power control device 4 can minimize an influence of noise.

In this way, the backup power supply 9 can continuously operate through the third circuit I3 even in the abnormal state and supply the electric power W3 to the DC power supply 8 and the ECU 10.

For example, when the connection lines L3 and L4 are broken, as illustrated in FIG. 2B, the third circuit I3 and the fourth circuit I4 are formed. Thus, the ECU 10 receives the supply of the electric power W3 from the backup power supply 9.

Although the embodiment of the present invention has been described in detail above with reference to the drawings, the specific constitution is not limited to this embodiment and also includes designs and the like without departing from the gist of the present invention.

As described above, the electric power control device 4 according to this embodiment includes the first ground line GND1L and the second ground line GND2L. Furthermore, the electric power control device 4 electrically connects the first ground line GND1L to the second ground line GND2L and eludes the current path formation unit 11 configured to form a path in which a current flows from the first ground line GND1L to the second ground line GND2L in one direction. The electric power control device 4 includes the noise minimizing component 12 connected to the current path formation unit 11 in series.

With such a constitution, even in the case of an abnormal state, it is possible to supply electric power from the backup power supply 9 to the ECU 10 and to minimize conduction noise propagating through a path formed through the current path information unit 11.

What is claimed is:

1. An electric power control device installed in a vehicle, comprising:
    an electronic control unit (ECU) to which electric power is supplied from a battery installed in the vehicle;
    a direct current (DC) power supply configured to generate a control power supply from the electric power supplied from the battery;
    a backup power supply configured to operate using the control power supply as an operation source, supply electric power to the ECU when electric power supply from the battery to the ECU is stopped, and supply electric power to the DC power supply when the electric power supply from the battery to the DC power supply is stopped;
    a first ground line connected to a ground terminal of the DC power supply;
    a second ground line connected to a ground terminal of the backup power supply;
    a current path formation unit which electrically connects the first ground line to the second ground line and forms a path in which a current flows from the first ground line to the second ground line in one direction; and
    a noise minimizing component connected to the current path formation unit in series.

2. The electric power control device according to claim 1, wherein the current path formation unit is a diode which has an anode electrically connected to the first ground line and a cathode electrically connected to the second ground line.

3. The electric power control device according to claim 2, wherein the noise minimizing component is an inductor, and the inductor has a first end portion connected to the cathode and a second end portion connected to the second ground line.

* * * * *